United States Patent [19]

Anahara et al.

[11] Patent Number: 5,270,094
[45] Date of Patent: Dec. 14, 1993

[54] THREE-DIMENSIONAL FABRIC WITH SYMMETRICALLY ARRANGED WARP AND BIAS YARN LAYERS

[75] Inventors: Meiji Anahara; Yoshiharu Yasui, both of Kariya; Masataka Sudoh; Mikiya Nishitani, both of Kakamigahara, all of Japan

[73] Assignees: Kabushiki Kaisha Toyoda Jidoshokki Seisakusho, Kariya; Kawasaki Jukogyo Kabushiki Kaisha, Kobe, both of Japan

[21] Appl. No.: 961,133

[22] Filed: Oct. 14, 1992

[30] Foreign Application Priority Data

Oct. 17, 1991 [JP] Japan ................................. 3-269578

[51] Int. Cl.⁵ .............................................. D03D 3/00
[52] U.S. Cl. ................................. 428/113; 139/384 R; 139/DIG. 1; 139/34; 428/119; 428/233; 428/246; 428/408; 428/902
[58] Field of Search ................ 139/34, DIG.1, 384 R; 428/113, 119, 233, 246, 408, 902

[56] References Cited

U.S. PATENT DOCUMENTS

| | | |
|---|---|---|
| 3,834,424 | 9/1974 | Fukuta et al. . |
| 4,336,296 | 6/1982 | Fukuta et al. ............. 139/DIG. 1 X |
| 5,104,726 | 4/1992 | Ross ............................. 139/384 R X |
| 5,137,058 | 8/1992 | Anahara et al. .......... 139/DIG. 1 X |

FOREIGN PATENT DOCUMENTS

WO-14454 11/1990 PCT Int'l Appl. .

*Primary Examiner*—Andrew M. Falik
*Attorney, Agent, or Firm*—Brooks Haidt Haffner & Delahunty

[57] ABSTRACT

A three-dimensional fabric has three axes defined along its length, width and thickness directions, and an imaginary plane that bisects the fabric along its thickness or transverse direction. The fabric comprises a plurality of warp layers that are symmetrically arranged with respect to the imaginary plane. A plurality of first and second bias-yarn layers are symmetrically arranged with respect to the imaginary plane. A vertical yarn runs through the fabric in the transverse direction, to couple all the yarn layers.

13 Claims, 10 Drawing Sheets

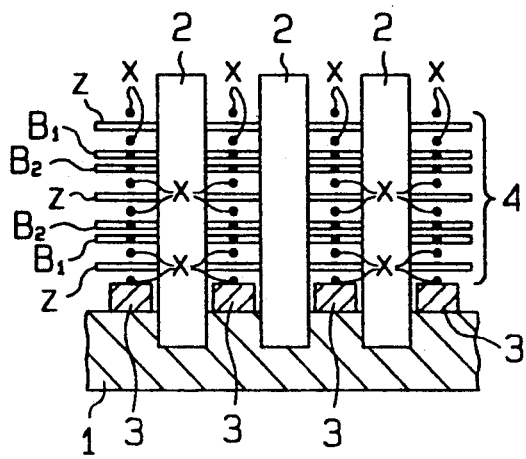
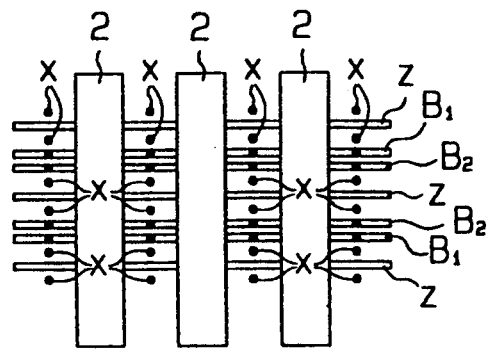
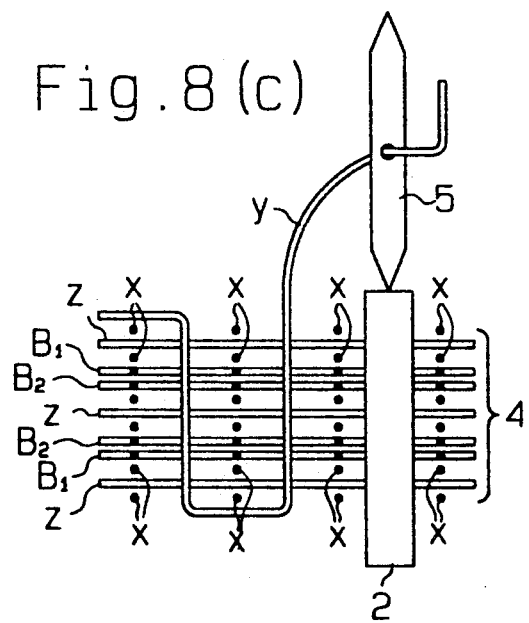
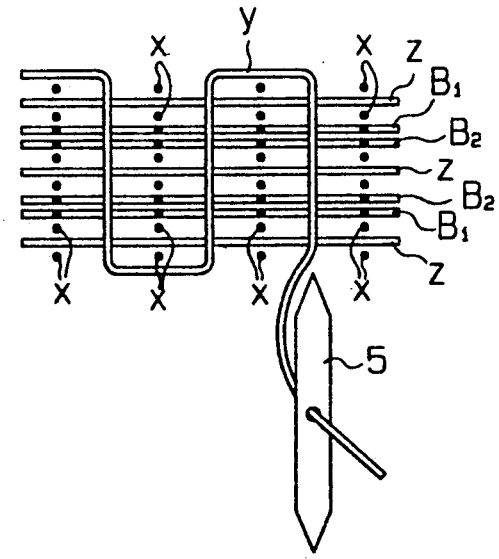
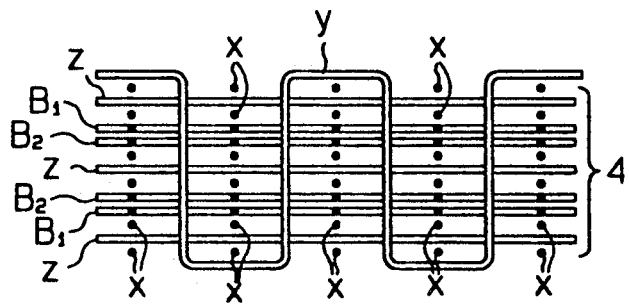

THREE-DIMENSIONAL FABRIC WITH SYMMETRICALLY ARRANGED WARP AND BIAS YARN LAYERS

BACKGROUND OF THE INVENTION

1. Field of the Invention

The present invention relates generally to a three-dimensional fabric suitable as the frame member of a composite. More particularly, this invention relates to a three-dimensional fabric which has layers of bias yarns which are obliquely arranged.

2 Description of the Related Art

Composite materials having a three-dimensional fabric as a frame member, are expected to be widely used as structural materials for rockets, aircraft, automobiles, marine vessels and buildings. A composite material generally includes three kinds of threads or yarns, extending in the X, Y and Z axial directions. The frame member is impregnated with a resin or another inorganic substance. While this type of composite-material shows sufficient strength to tensile, compressive, and bending loads along the X, Y and Z directions, it is still deformable by forces along the oblique direction with respect to each axial direction.

One attempt to rectify this undesirable characteristic, was described in Japanese Unexamined Patent Publication No. 1-292162, Japanese Unexamined Patent Publication No. 3-76845 and WO 90/14454. These publications describe five-axis three-dimensional fabrics, with bias yarns that are angularly arranged with respect to the lengthwise direction of the three-dimensional fabric. These bias yarns are in addition to yarns extending in the X, Y and Z axial directions.

As shown in FIG. 13, the conventional five-axis three-dimensional fabric comprises a warp layer consisting of multiple lines of a warp z, arranged parallel to the lengthwise direction of the fabric. Bias-yarn layers including two types of bias yarns $B_1$ and $B_2$ are angularly arranged with respect to the lengthwise direction of the fabric, in a plane parallel to the warp layer. A weft layer consisting of lines of a weft x are arranged in the width direction of the fabric, perpendicularly to the warp z. The five-axis three-dimensional fabric further includes a number of vertical yarns y arranged in the thickness or transverse direction of the fabric, perpendicularly to the warp z.

Each bias-yarn layer is constituted of a pair of two adjoining, upper and lower yarn layers. The arrangement of the bias yarns $B_1$ and $B_2$ is identical in any pair of upper and lower yarn layers. More specifically, the bias yarns $B_1$ of the upper bias-yarn layer are arranged always at an inclination of $+\Theta$ with respect to the warp yarns z, while the bias yarns $B_2$ of the lower bias-yarn layer are arranged always at an inclination of $-\Theta$ with respect to the warp yarns z.

In producing a composite having a three-dimensional fabric as its frame member, at the time the three-dimensional fabric is impregnated with a resin to be hardened, the composite contracts due to the hardening of the resin and yarn deformation. If the fibers of the three-dimensional fabric were carbon fibers or the like, which have a small coefficient of linear expansion and high rigidity, the contraction does not occur in the axial directions of the yarns, but rather occurs only in the directions perpendicular to the yarn axes. In this case, the contractional directions of the warp layer, weft layer and bias-yarn layers are different from one another. Depending on the fabrication conditions, such as the laminating order of the individual layers and the number of layers, the composite would bend or twist after the hardening of the resin.

In the conventional three-dimensional fabric, the first and second bias yarns ($B_1$, $B_2$) in any pair of the bias yarns, are vertically arranged in the same manner. If a composite having the conventional three-dimensional fabric as its frame member is produced, the residual deformations of the individual yarn layers would be added together at the time of resin impregnation and hardening. Such residual deformations will warp or twist the plate-like composite, thus reducing the accuracy in sizing the composite.

SUMMARY OF THE INVENTION

Accordingly, it is a primary objective of the present invention to provide a three-dimensional fabric suitable as the frame member of a composite, which can allow a composite of a desired shape to be produced, without being bent or twisted.

To achieve the foregoing and other objects and in accordance with the purpose of the present invention, an improved three-dimensional fabric is provided. The three-dimensional fabric embodying this invention has three axes which respectively correspond to the length, width and thickness of the fabric, and an imaginary plane defined by a central warp layer that bisects the fabric at the center, in the thickness or transverse direction of the fabric.

The fabric comprises a plurality of warp layers that are generally symmetrically arranged with respect to the imaginary plane. A plurality of first bias-yarn layers are also generally symmetrically arranged with respect to the imaginary plane. A plurality of second bias-yarn layers. are generally symmetrically arranged with respect to the imaginary plane. A vertical yarn runs through the fabric, substantially in the transverse direction, for interconnecting all the yarn layers. Each of the warp layers includes at least one warp (z) arranged in parallel, along the lengthwise direction of the fabric. Each of the first bias-yarn layers includes at least one first bias yarn ($B_1$) which is angularly arranged, with respect to the lengthwise direction of the fabric. Each of the second bias-yarn layers includes at least a second bias yarn ($B_2$) which is angularly arranged with respect to the lengthwise direction of the fabric. The first bias yarn ($B_1$) and the second bias yarn ($B_2$) are arranged in a generally axial symmetrical opposing angular fashion to each other, with respect to the lengthwise direction of the fabric. The number of the first bias-yarn layers is equal to that of the second bias-yarn layers.

In producing a plate-like composite having this three-dimensional fabric as its frame member, at the time the fabric is impregnated with a resin and the resin is hardened, the force, originating from the contraction of the resin or the residual deformation which has occurred when arranging the yarns, acts along the symmetrical directions with respect to the imaginary plane. In addition, the individual yarn layers are firmly interconnected by the vertical yarn. The forces acting along the symmetrical directions cancel out each other, thus suppressing the bending of the composite.

In the preferred embodiment, two vertical yarns are inserted between the same lines of the warp, and the two vertical yarns are looped back in opposite directions. In this case, the two vertical yarns are inserted between the warp lines, and are arranged in the same state between every adjoining or associated warp line. Thus, the force of the vertical yarn for tightening the individual yarn layers is uniformly distributed.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 8 is a schematic diagram showing how a pin is replaced with a vertical yarn;

DETAILED DESCRIPTION OF THE PREFERRED EMBODIMENTS

First Embodiment

A first embodiment of the present invention will now be described referring to FIGS. 1 through 8.

Figure 1:
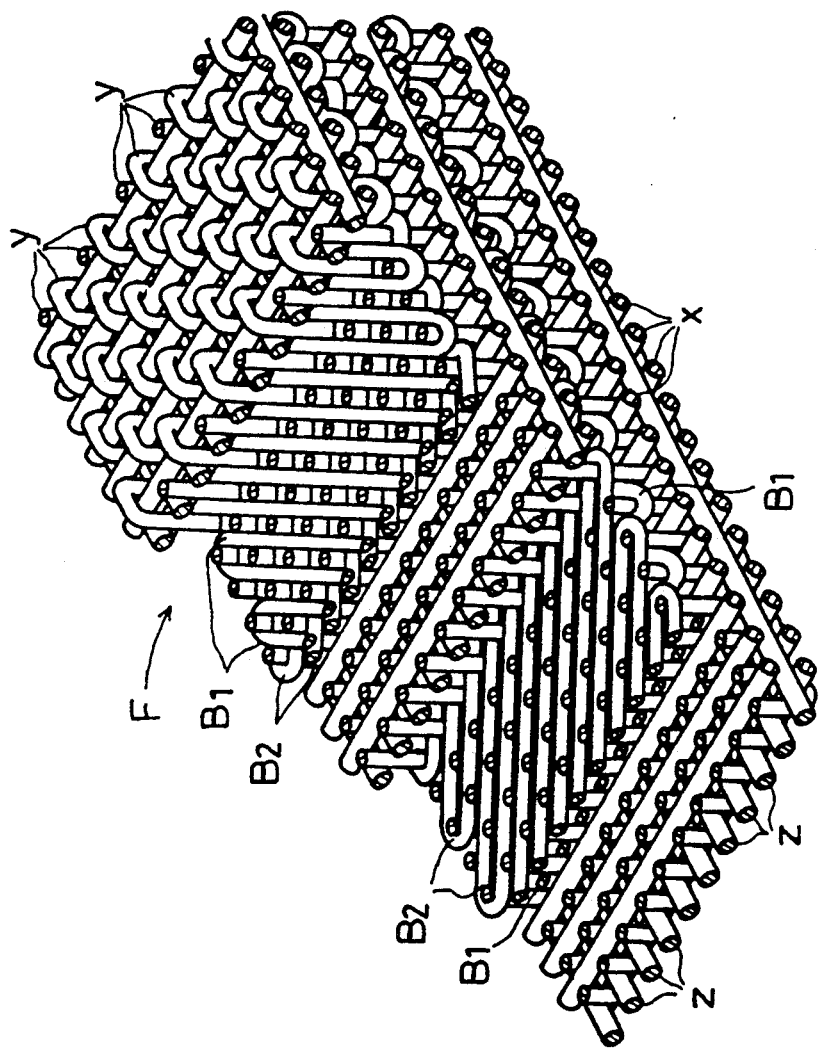
FIG. 1 is a partial schematic perspective view of a three-dimensional fabric according to a first embodiment of the present invention.
Figure 2:
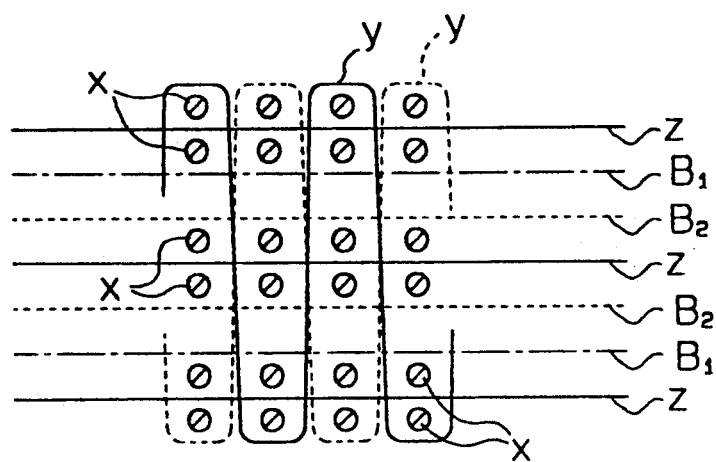
FIG. 2 is a schematic diagram illustrating the arrangement of individual yarn layers used in the fabric of FIG. 1.

As shown in FIGS. 1 and 2, a three-dimensional fabric F comprises a plurality of warp layers (three in this embodiment). Each warp layer includes a plurality of lines forming a warp z, and running in parallel along the lengthwise direction of the fabric. Each warp layer further includes a plurality of pairs of bias-yarn layers (two pairs in this embodiment). Each pair includes lines forming a first bias yarn $B_1$, and lines forming a second bias yarn $B_2$. The lines of the first and second bias yarns $B_1$ and $B_2$ are arranged along mutually perpendicular directions, generally symmetrically with respect to the lengthwise direction of the fabric. Each warp layer further includes a plurality of weft layers (six in this embodiment). Each weft layer comprises a plurality of lines forming a weft x, and arranged in the width direction of the fabric, perpendicularly to the warp z.

The three-dimensional fabric F further includes a plurality of lines forming a vertical yarn y that run perpendicularly through the individual yarn layers, in order to interconnect the yarn layers. The first and second bias yarns $B_1$ and $B_2$ are generally arranged at an angular relationship with respect to the warp yarns z. In the preferred embodiment, this angular relationship is $\pm 45°$. In other words, the three-dimensional fabric F has a five-axis structure in which fabrics have four axes in one plane, and are interconnected by the lines of the vertical yarn y.

Each of the warp layers, weft layers and bias-yarn layers is formed integrally by looping one yarn or multiple yarns back and forth several times. For instance, the warp yarn z is repeatedly looped back while running in parallel along the lengthwise direction of the fabric. Similarly, the weft yarn x is repeatedly looped back and forth while running in parallel along the width direction of the fabric. In FIG. 1, the loop-back sections of the warp z and weft x are not shown.

The first bias yarn $B_1$ is looped back to run at an angle of $\pm 45°$ with respect to the warp yarns z. The second bias yarn $B_2$ is looped back to run at an angle of $-45°$ with respect to the warp yarns z. The lines of the vertical yarn y run through the fabric F in the transverse direction. Each of these lines is arranged between the lines of the warp z adjoining in the width direction in a zigzag fashion, and looping back at the top and bottom of the fabric F. The vertical yarn y is inserted between the adjoining lines of the warp z, and is looped back at positions alternately shifted in the lengthwise direction of the fabric F.

As shown in FIG. 2, above the warp layer z located at the center of the fabric F in the transverse direction, lie a weft layer x, a layer of the second bias yarns $B_2$, a layer of the first bias yarns $B_1$, another weft layer x, another warp layer z and a further weft layer x. This arrangement is indicated from the center warp layer z upward by (z, x, $B_2$, $B_1$, x, z, x). Below the center warp layer lie a weft layer x, a layer of the second bias yarns $B_2$, a layer of the first bias yarns $B_1$, another weft layer x, another warp layer z and a further weft layer x. This arrangement is also indicated from the center downward by (z, x, $B_2$, $B_1$, x, z, x). Consequently, the arrangement of the individual yarn layers is symmetrical with respect to the warp layer z which is located at the center of the fabric F.

The fabric F is used as the frame member of a composite which is impregnated with resin or the like material. Because of the presence of the first and second bias yarns $B_1$ and $B_2$, the composite having this fabric F as its frame member has smaller deformation under the force acting obliquely than a conventional fabric. Various types of fibers with a small coefficient of thermal expansion, which have higher strength and higher elasticity than a matrix, are used as the fibers constituting the three-dimensional fabric. For instance, carbon fibers, ceramic fibers, glass fibers, and aramid fibers are preferable. The resin forming the matrix could be thermoplastic resin as well as a thermosetting resin (such as an epoxy resin).

The present invention can be applied to a composite of carbon fibers and a carbon matrix obtained by using a carbon fiber as the fiber forming the three-dimensional fabric, impregnating with resin and thereafter hardening the resin by subjecting it to sintering. Alternatively, the fabric can be impregnated with a pitch as the matrix. See FIG. 16 which is illustrative of a frame fabric that has been impregnated with a matrix M.

The fabrication process for the composite, includes the steps of impregnating the fabric with resin or pitch, and hardening the resin by raising its temperature. Thus, the contraction occurs due to the hardening reaction of the resin, and the residual deformation of the yarns (fibers) constituting the three-dimensional fabric emerges. As seen from the three-dimensional fabric F embodying the present invention, the individual yarn layers and the directions of the yarns are arranged as mirror images of each other with respect to the warp layer z which is located at the center of the fabric F.

Accordingly, the contraction of the resin and the force originating from the residual deformation locked into the yarn at the time of yarn weaving act along symmetrical directions, with the plane of symmetry inbetween. Since the individual yarn layers are firmly coupled together by the lines of the vertical yarn y, the forces acting in the symmetric directions tend to cancel out each other, thus suppressing bending and twisting of the composite. The present invention is thus effective when the fibers are of anisotropic materials which have different physical properties in the axial direction and the diameter direction, or when a resin which greatly contracts when being hardened is used.

If the arrangement of the individual yarn layers and the directions of the yarns are symmetrical to each other, as discussed earlier, each individual yarn layer exerts a force to deform the other in the opposite direction, thus increasing the chance of separating one layer from another. Therefore, the interlaminer coupling performance of the vertical yarn y plays a more important role. When the interlaminer separation force is strong, it is preferable to make the vertical yarn y thicker or increase the frequency of inserting lines of the vertical yarn y in order to enhance the coupling force of the vertical yarn y.

Figure 3:
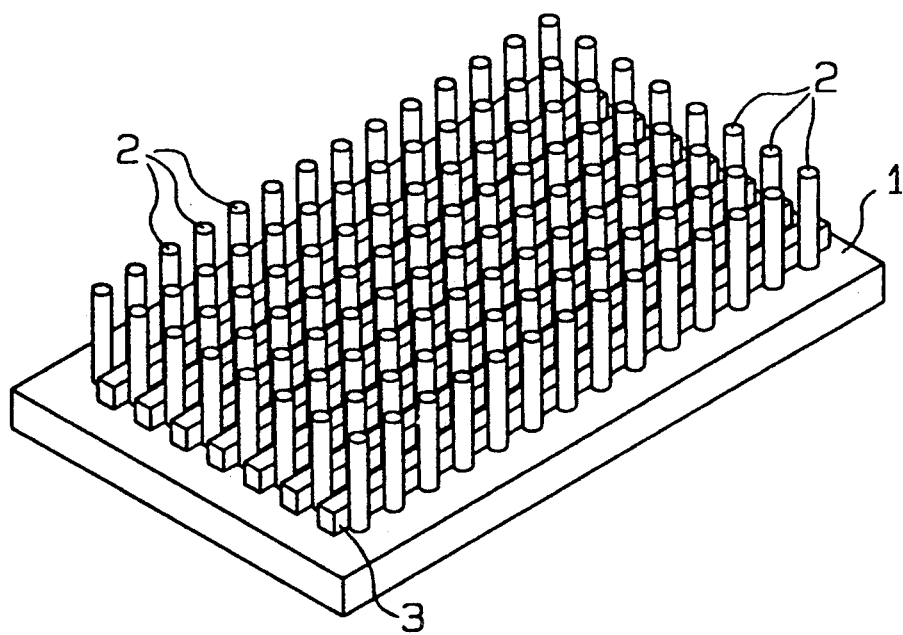
FIG. 3 is a perspective view showing a base used in fabricating the fabric of FIG. 1.

One example of a method of fabricating the fabric F will be described below. In fabricating the fabric F, a flat base 1 as shown in FIG. 3 is used. On one surface of the base 1 stand detachably a number of pins 2 at given pitches, which regulate the arrangement of the yarns. With a support bar 3 disposed between the pins 2 on the base 1, the lines of the weft x, the lines of the warp z and the first and second bias yarns $B_1$ and $B_2$ are arranged, so as to run between the pins 2, and to be looped back, in engagement with those pins 2 which are located along the peripheral portion of the base 1. The weft layer, warp layer and bias-yarn layer are inter-laminated in order.

Figure 4:
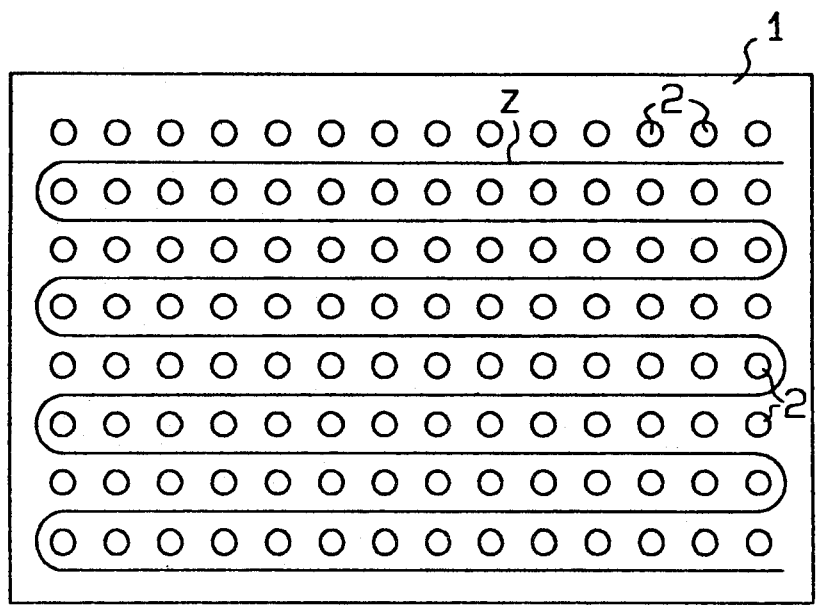
FIG. 4 is a schematic plan view showing the arrangement of warp lines in the fabric of FIG. 1.
Figure 5:
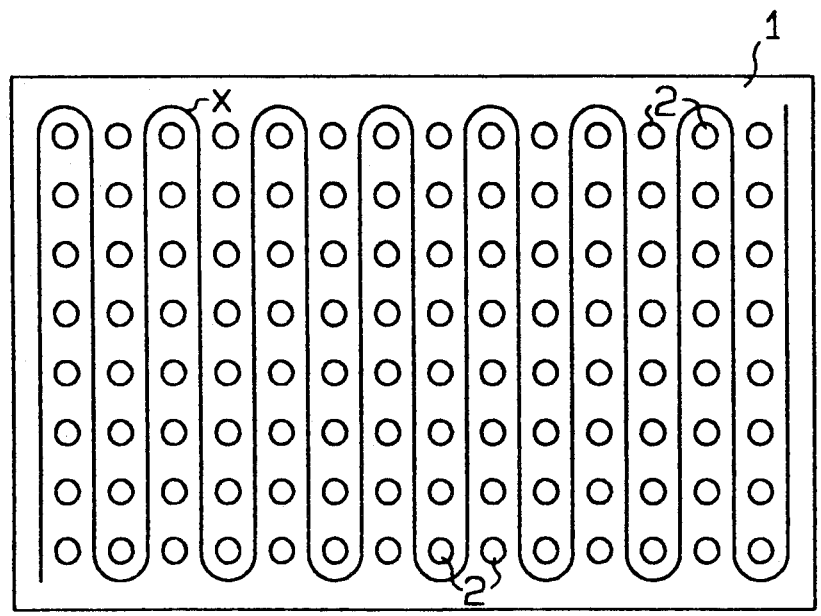
FIG. 5 is a schematic plan view showing the arrangement of weft lines in the fabric of FIG. 1.
Figure 6:
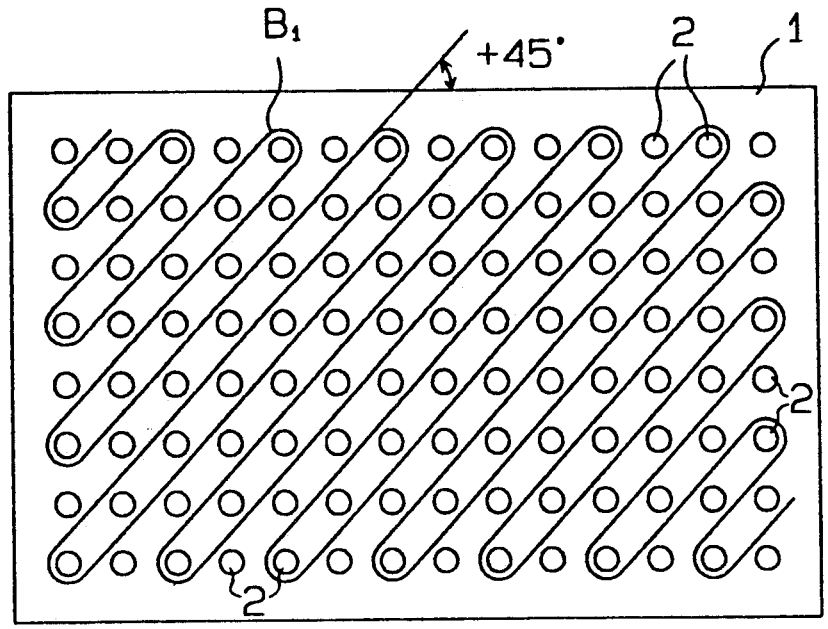
FIG. 6 is a schematic plan view showing the arrangement of the lines of a bias yarn $B_1$ in the fabric of FIG. 1.
Figure 7:
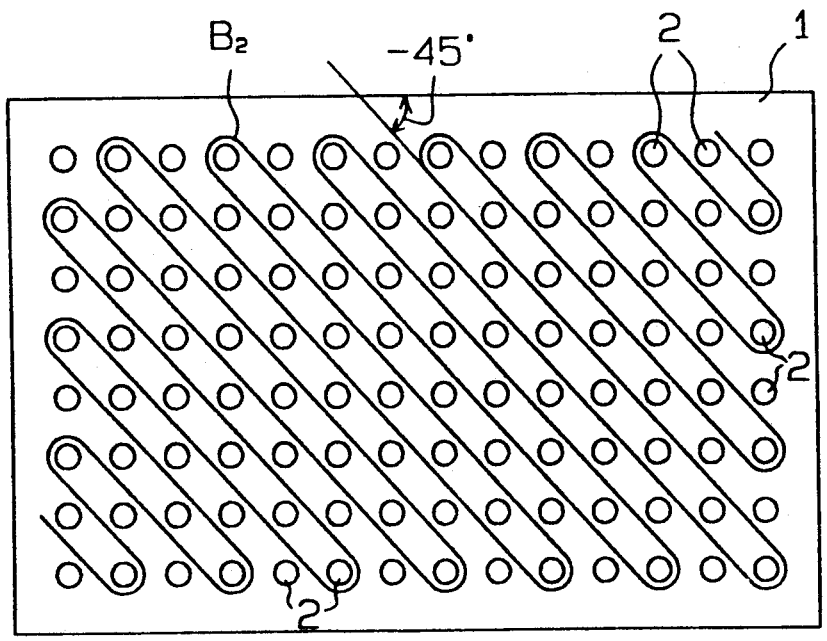
FIG. 7 is a schematic plan view showing the arrangement lines of another bias yarn $B_2$ in the fabric of FIG. 1.

The lines of the warp z are arranged in parallel, in the lengthwise direction of the fabric, while being repeatedly looped back and forth around the pins 2 located at both ends of the base 1 in the lengthwise direction, as shown in FIG. 4. The lines of the weft x are arranged in parallel, in the width direction of the fabric, while being repeatedly looped back and forth around the pins 2 located at the right and left sides of the base 1, as shown in FIG. 5. The lines of the first bias yarn $B_1$, which form the first layer of a pair of bias-yarn layers, are arranged at an angle of $+45°$ with respect to the lengthwise direction of the fabric, while being repeatedly looped back and forth around the pins 2 located at the peripheral portion of the base 1, as shown in FIG. 6. The lines of the second bias yarn $B_2$, which form the second layer of the pair, are arranged at an angle of $-45°$ with respect to the lengthwise direction of the fabric, while being repeatedly looped back and forth around the pins 2 located at the peripheral portion of the base 1, as shown in FIG. 7.

As shown in FIG. 8(a), after the individual yarn layers are established one on another on the base 1 in a predetermined order, yielding a multi-layered structure lamination 4, a compressive force is applied to increases the density of the fibers and to adjust the thickness. More specifically, pressure bars (not shown) are arranged on the multi-layered structure 4 in association with the support bars 3, so that the multi-layered structure 4 is compressed by the support bars 3 and the pressure bars. It is preferable that this compression be performed, not only when the arrangement of the weft x, warp z and the first and second bias yarns $B_1$ and $B_2$ are all completed, but also gradually during the process of arranging those yarns. The latter compression will decrease variation in fiber density, and can increase the density.

Next, as shown in FIG. 8(b), the structure 4 and the pins 2 are separated from the, base 1. The support bars 3 between the base 1 and the structure 4 facilitates the separation of the pins 2 and the structure 4 from the base 1. The pins 2 are removed from the base and are replaced with the lines of the vertical yarn y, by means of the needle 5 so that the layers of the multi-layered structure 4 are interconnected by the lines of the vertical yarn y.

As shown in FIG. 8(c), with the distal end of the needle 5 abutting on the associated pin 2, the needle 5 is thrust into the structure 4 to drive out the pin 2. Thereafter, as shown in FIG. 8(d), the needle 5 is pulled out from the opposite side of the structure 4, moving through the space where the pin 2 has been removed, thus completing the replacement of the pin 2 with the vertical yarn y. The same operation is then repeated on the adjoining pin 2 from the opposite side, for replacing the adjoining pin 2 with the vertical yarn y. Likewise, the pins 2 are sequentially replaced with lines of the vertical yarn y, so that the individual yarn layers forming the multi-layered 4 are firmly secured together by the lines of the vertical yarn y as shown in FIG. 8(e).

Second Embodiment

Figure 9:
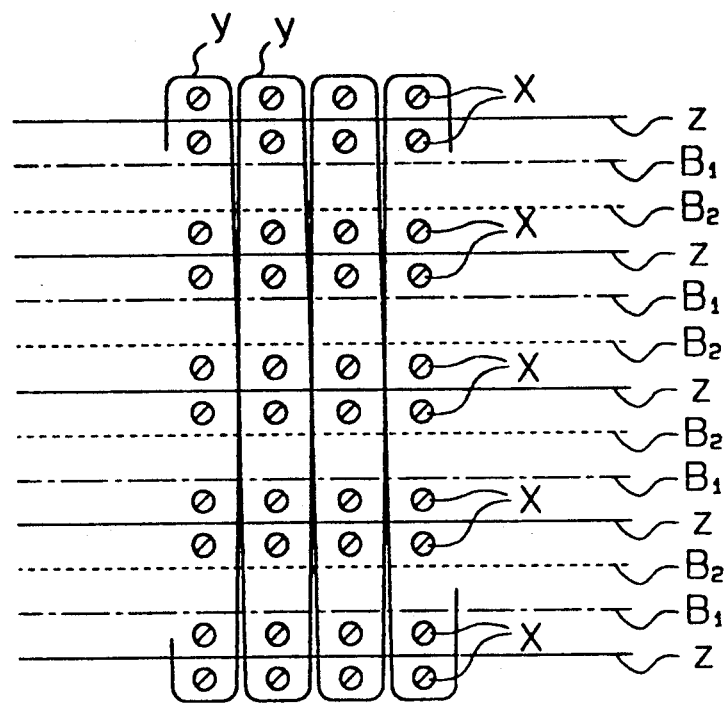
FIG. 9 is a schematic diagram illustrating the arrangement of individual yarn layers of a three-dimensional fabric according to a second embodiment of the present invention.

A second embodiment will now be described referring to FIG. 9. A three-dimensional fabric F according to this embodiment differs from the three-dimensional fabric F of the previous embodiment in that it includes more weft layers, warp layers and bias-yarn layers; and two vertical yarns y instead of one are inserted between the adjoining lines in the width direction of the respected warp layers z.

According to the structure of the first embodiment, one vertical yarn y is inserted between every adjoining line of the warp z, and the adjoining lines of the vertical yarn y are looped back and forth at positions shifted in the lengthwise direction of the three-dimensional fabric F. The force of the vertical yarn y to tighten the individual yarn layers through the lines of the weft x is not therefore strictly uniform. According to the structure of the second embodiment, two vertical yarns y are inserted between adjoining lines of the respective warp z, and are looped back and forth in the opposite directions. Since two vertical yarns y inserted between the warp lines z are arranged in the same state for every adjoining line of the warp z, the force of tightening the individual yarn layers can be made strictly uniform.

As the number of the bias-yarn layers forming three-dimensional fabric F increases, the tendency of the yarn layers for being separated from one another at the imaginary symmetric plane at the center of the fabric in the transverse direction increases. Since the three-dimensional fabric F according to the second embodiment uses twice the number of vertical yarns y used in the first embodiment, the tightening of the multi-layer structure 4 by the vertical yarns y can be made stronger, as compared with that of the first embodiment. The interlaminer coupling performance of the vertical yarns y becomes more effective to prevent the composite from being bent when the latter is being formed. The yarn layers should not be separated from each other.

Third Embodiment

Figure 10:
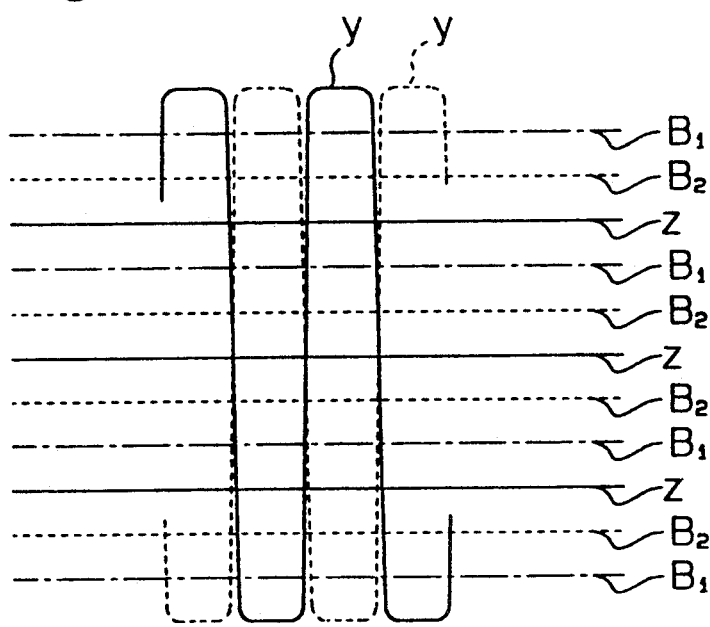
FIG. 10 is a schematic diagram illustrating the arrangement of individual yarn layers of a three-dimensional fabric according to a third embodiment of the present invention.
Figure 15:
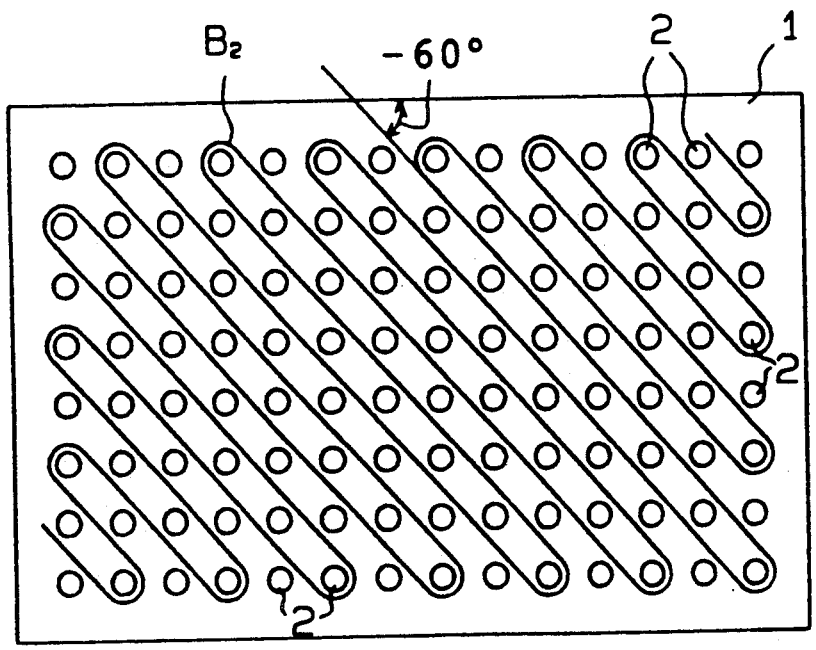
FIG. 15 is a schematic plan view similar to FIG. 7 showing a modification of the bias yarn $B_2$.
Figure 16:
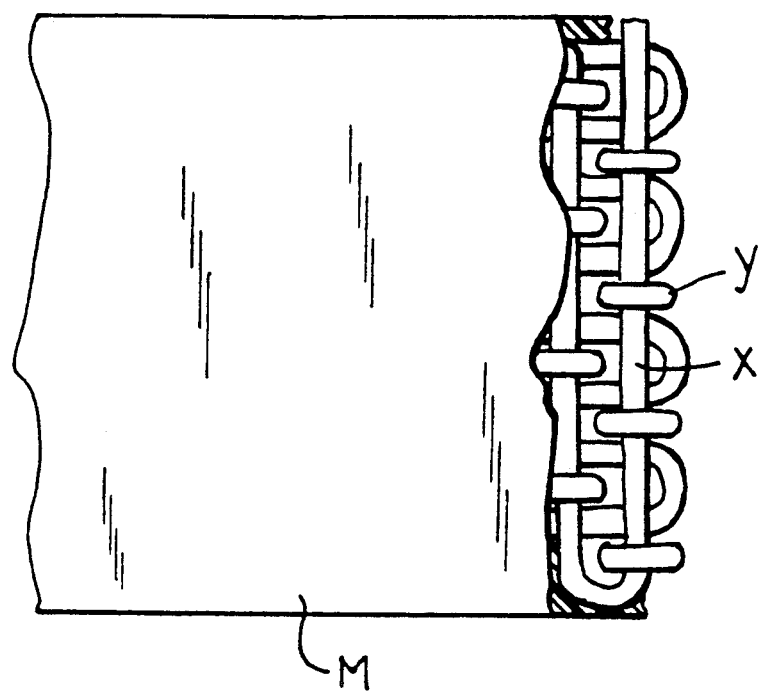
FIG. 16 is a partial schematic view with portions broken away showing a composite structure.

A third embodiment will now be described referring to FIG. 10. This embodiment differs from the previous two embodiments in that the three-dimensional fabric F has no weft layer. The fabric F according to the third embodiment comprises four pairs of bias-yarn layers, three warp layers and vertical yarns y. The first and second bias yarns $B_1$ and $B_2$ forming each pair of bias-yarn layers are arranged at an angle of $\pm 60°$ with respect to the wrap yarns z as shown in FIGS. 15 and 16. This arrangement of the first and second bias yarns $B_1$ and $B_2$ achieves isotropy to the force that acts along the plane perpendicular to the vertical axis. The fabric F has a simpler structure than a five-axis three-dimensional fabric having four axes in a plane. Further, as there is no weft x, it is easier to make the first and second bias yarns $B_1$ and $B_2$ thicker, so that the ratio of the bias yarns relative to the total fibers is increased.

Although only three embodiments of the present invention have been described herein, it should be apparent to those skilled in the art that the present invention may be embodied in many other specific forms without departing from the spirit or scope of the invention. Particularly, it should be understood that this invention may be worked out in the following manners.

Figure 11:
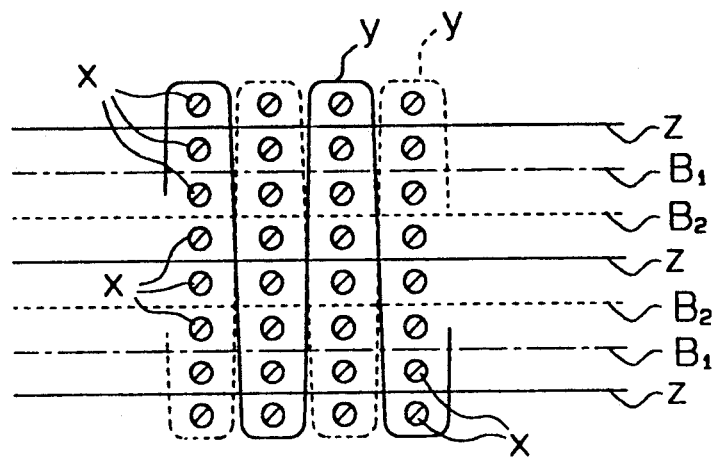
FIG. 11 is a schematic diagram illustrating a modification to the arrangement of individual yarn layers in the three-dimensional fabric according to the present invention.

For instance, the first and second bias yarns $B_1$ and $B_2$ forming each pair of bias-yarn layers do not need to be arranged adjacent to each other, but a weft layer may be disposed between the layer of the first bias yarns $B_1$ and the layer of the second bias yarns $B_2$ as shown in FIG. 11. Alternatively, a warp layer or both a warp layer and a weft layer may be disposed between the layer of the first bias yarns $B_1$ and the layer of the second bias yarns $B_2$. In forming the three-dimensional fabric, pipes may be used in place of the pins 2, to regulate the yarn arrangement.

Figure 12:
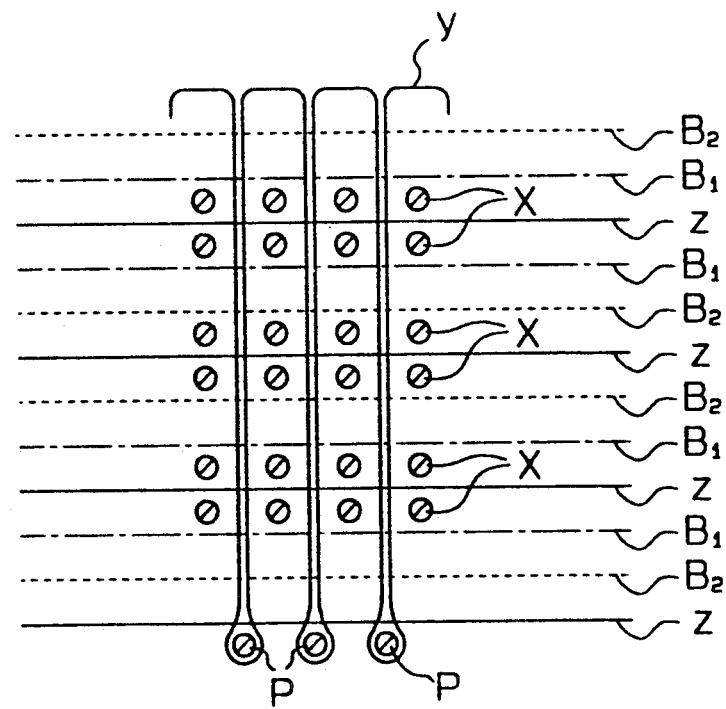
FIG. 12 is a schematic diagram illustrating another modification to the arrangement of individual yarn layers in the three-dimensional fabric according to the present invention.
Figure 13:
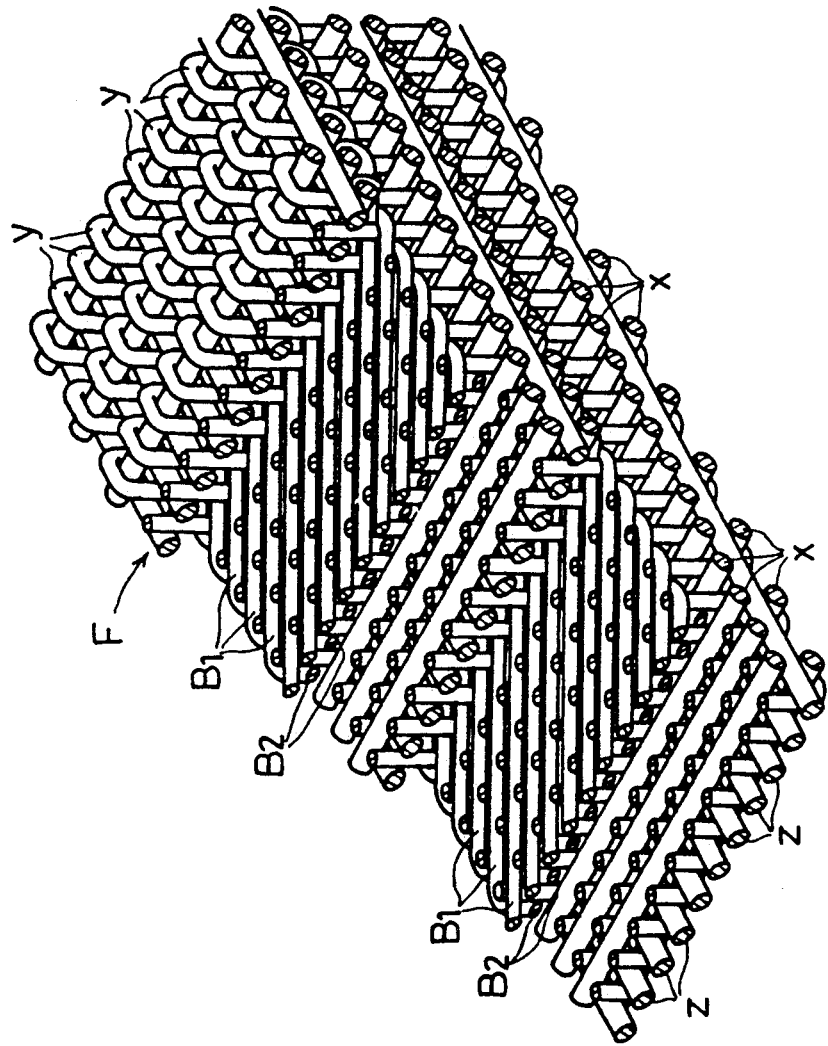
FIG. 13 is a partial schematic perspective view of a conventional three-dimensional fabric.
Figure 14:
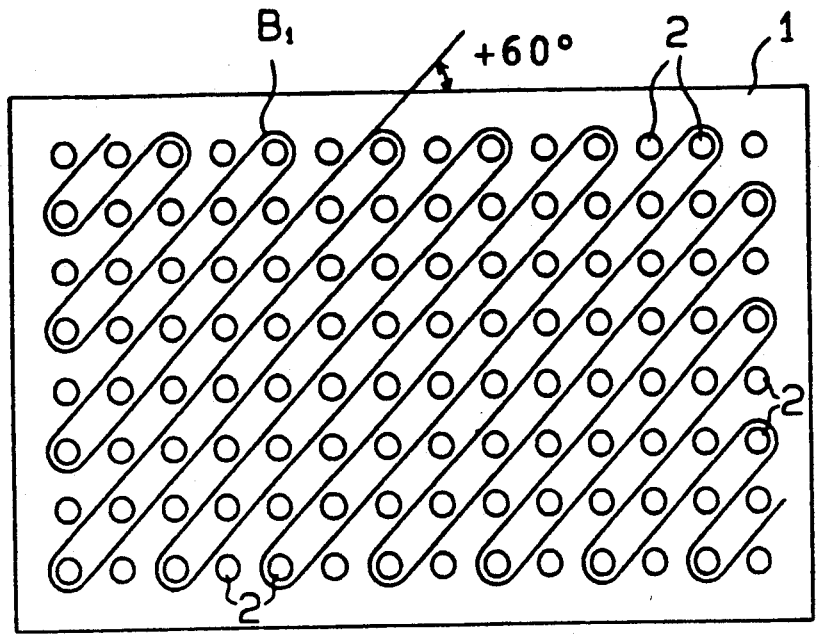
FIG. 14 is a schematic plan view similar to FIG. 6 showing a modification of the bias yarn $B_1$.

As a way of replacing a pin or a pipe with a vertical yarn y, a vertical yarn y may be inserted in a loop shape from one side of the fabric. A selvage thread, which serves to prevent the vertical yarn y from becoming detached from the fabric, is inserted in the loop to serve as a loop stopper. When the selvage thread is used, there is no thread which is symmetrical to the selvage thread P with respect to the center of the fabric, as shown in FIG. 12, so that mirror symmetry is not provided in a strict sense. Because the ratio of the portion of the selvage thread P to the entire layers of the three-dimensional fabric F is normally small, the presence of the selvage thread P is negligible. FIG. 12 illustrates an example in which the arrangement of the bias yarns $B_1$ and $B_2$ on one side of the center plane of the fabric is opposite to that on the other side of that center plane, and the arrangements are generally symmetrical with respect to the center of the transverse direction of the fabric.

The shape of the three-dimensional fabric F is not limited to a flat shape, but the fabric may have other shapes, such as the shape of a curved plate and the shape of a bent plate. In this case, the fabric can be fabricated using a base with the intended shape on which many pins or pipes are mounted.

Further, the pins or pipes are not essential in the fabrication of the frame. Other means can be used, such as the device disclosed in Japanese Unexamined Patent Publication No. 3-76845. If a three-dimensional fabric is fabricated by weaving machine similar to that disclosed in this Japanese publication instead of using the above-described pin system, a selvage thread is necessary so that symmetry is not achieved in a strict sense. But, because the ratio of the portion of the selvage thread P to the entire layers of the three-dimensional fabric F is normally small, the presence of the selvage thread P is negligible as explained earlier.

Therefore, the present examples and embodiments are to be considered as illustrative and not restrictive, and the invention is not to be limited to the details given herein.

What is claimed is:

1. A three-dimensional fabric having three axes defined along its length, width and thickness directions, and an imaginary longitudinal plane defined by a central warp layer that bisects said fabric in the thickness direction, said fabric comprising:

a plurality of warp layers arranged symmetrically with respect to said imaginary plane, each of said warp layers including at least one warp yarn arranged in parallel lines along the length direction;

a plurality of first bias-yarn layers arranged symmetrically with respect to said imaginary plane, each of said first bias-yarn layers consisting of at least one first bias yarn arranged in parallel lines at an angular relationship with respect to the length direction;

a plurality of second bias-yarn layers arranged symmetrically with respect to said imaginary plane, each of said second bias-yarn layers consisting of at least one second bias yarn arranged in parallel lines at an angular relationship with respect to the length direction;

said first bias yarn and said second bias yarn being arranged in a mutually symmetrical opposing angular relationship with respect to the length direction, wherein the number of said first bias-yarn layers is substantially equal to that of said second bias-yarn layers; and connecting means for connecting all of said yarn layers together, said connecting means including at least one vertical yarn running through the fabric generally in the thickness direction.

2. The fabric according to claim 1 further comprising a plurality of weft layers symmetrically arranged with respect to said imaginary plane, each one of said weft layers including at least one weft yarn (x) arranged in parallel lines along the width direction.

3. The fabric according to claim 1, wherein each one of said first bias-yarn layers is arranged adjacent to an associated one of said second bias-yarn layers.

4. The fabric according to claim 1, wherein said connecting means includes two vertical yarns (y) inserted between adjoining warp yarns (z) along the width direction of the fabric, and wherein said two vertical yarns (y) run through the fabric while being repeatedly looped back and forth in opposite directions.

5. The fabric according to claim 1, wherein said first bias yarn is arranged at an angle of +60° with respect to said length direction, and said second bias yarn is arranged at an angle of −60° with respect to said length direction.

6. The fabric according to claim 2, wherein said first bias yarn is arranged at an angle of +45° with respect to said length direction, and said second bias yarn is arranged at an angle of −45° with respect to said length direction.

7. A composite including a frame member and a matrix material, said frame member including a three-dimensional fabric having three axes defined along its length, width and thickness directions, and an imaginary longitudinal plane defined by a central warp layer that bisects said fabric in the thickness direction, said fabric comprising:
   a plurality of warp layers arranged symmetrically with respect to said imaginary plane, each of said warp layers including at least one warp yarn arranged in parallel lines along the length direction:
   a plurality of first bias-yarn layers arranged symmetrically with respect to said imaginary plane, each of said first bias-yarn layers consisting of at least one first bias yarn arranged in parallel lines at an angular relationship with respect to the length direction:
   a plurality of second bias-yarn layers arranged symmetrically with respect to said imaginary plane, each of said second bias-yarn layers consisting of at least one second bias yarn arranged in parallel lines at an angular relationship with respect to the length direction;
   said first bias yarn and said second bias yarn being arranged in a mutually symmetrical opposing angular relationship with respect to the length direction, wherein the number of said first bias-yarn layers is substantially equal to that of said second bias-yarn layers; and
   connecting means for connecting all of said yarn layers together, said connecting means including at least one vertical yarn running through the fabric generally in the thickness direction; and said matrix material impregnating said frame member.

8. The composite according to claim 7, wherein said fabric further comprises a plurality of weft layers symmetrically arranged with respect to said imaginary plane, each one of said weft layers including at least one weft yarn (x) arranged in parallel lines along the width direction.

9. The composite according to claim 7, wherein each one of said first bias-yarn layers is arranged adjacent to an associated one of said second bias-yarn layers.

10. The composite according to claim 7, wherein said connecting means includes two vertical yarns (y) inserted between adjoining warp yarns (z) along the width direction of the fabric, and wherein said two vertical yarns (y) run through the fabric while being repeatedly looped back and forth in opposite directions.

11. The composite according to claim 7, wherein said first bias yarn is arranged at an angle of +60° with respect to said length direction, and said second bias yarn is arranged at an angle of −60° with respect to said length direction.

12. The composite according to claim 8, wherein said first bias yarn is arranged at an angle of +45° with respect to said length direction, and said second bias yarn is arranged at an angle of −45° with respect to said length direction.

13. A three-dimensional fabric having three axes defined along its length, width and thickness directions, and an imaginary plane defined by a central warp layer that bisects the fabric along the thickness direction, the fabric comprising:
   a plurality of warp layers being symmetrically arranged with respect to the imaginary plane, each of said warp layers including at least one warp arranged in parallel along the length direction;
   a plurality of first bias-yarn layers symmetrically arranged with respect to the imaginary plane, each of said first bias-yarn layers including at least one first bias yarn arranged in an angular relationship with respect to the length direction;
   a plurality of second bias-yarn layers symmetrically arranged with respect to the imaginary plane, each of said second bias-yarn layers including at least one second bias yarn arranged in an angular relationship with respect to the length direction;
   said first bias yarn and said second bias yarn being arranged in an axially symmetrical opposing angular relationship with respect to the length direction, wherein the number of said first bias-yarn layers is substantially equal to that of said second bias-yarn layers; and
   connecting means for connecting all of said yarn layers together, wherein said connecting means includes two vertical yarns (y) inserted between adjoining warp yarns (z) along the width direction of the fabric, and wherein said two vertical yarns (y) run through the fabric while being repeatedly looped back and forth in opposite directions.

* * * * *